Feb. 1, 1966
H. INDEST
3,232,715
APPARATUS FOR THE PRODUCTION OF POLYAMIDES
Filed Aug. 26, 1963
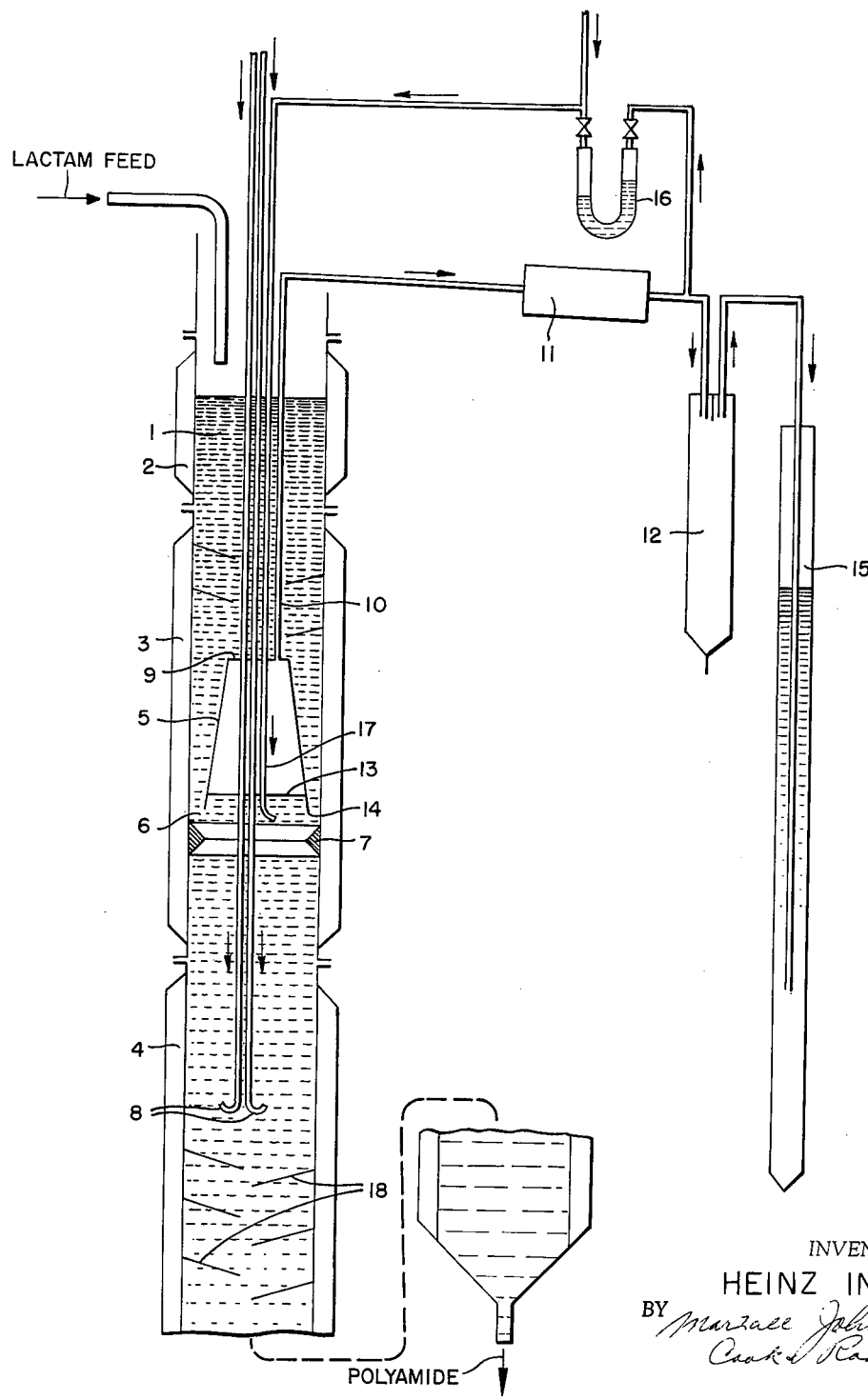
INVENTOR:
HEINZ INDEST United States Patent Office 3,232,715
Patented Feb. 1, 1966

3,232,715
APPARATUS FOR THE PRODUCTION OF POLYAMIDES
Heinz Indest, Obernburg (Main), Germany, assignor to Vereinigte Glanzstoff-Fabriken AG., Wuppertal-Elberfeld, Germany
Filed Aug. 26, 1963, Ser. No. 304,509
Claims priority, application Germany, Sept. 6, 1962, V 22,989
3 Claims. (Cl. 23—283)

The present invention relates to apparatus for the production of polyamides and, especially, to the continuous production of polyamides from caprolactam.

It is known in the art to polycondense polyamide-forming compounds such as caprolactam in vertical reaction vessels. In these vessels, which are normally held under atmospheric pressure, the reaction compound flows downwardly wherein, through the arrangement of baffle plates within the reaction vessel, provision is made for a uniform flow of the polycondensing melt. During the reaction water is present. Water is needed, however, only for the initial reaction, namely, the splitting open of the lactam ring while the subsequent conversion into the polymer chain with the development of the amide groups takes place with the production of water. The presence of relatively large amounts of water accelerates the initial reaction, but retards the formation of the polyamide. If the water is not removed, the establishment of an equilibrium in the reaction causes the reaction to come to a standstill. It is necessary, therefore, to remove the water from the reaction chamber. This can be accomplished according to known processes by conducting an inert gas through the polycondensing melt which gas carries along the water as it leaves the reaction chamber. The conduction through the inert gas system, and especially the emergence of the gas-steam mixture, however, must take place in such a way that any dehydration in the upper part of the reaction vessel is avoided as much as possible.

In a known technique, polyamides are formed in a tanklike structure subdivided by spirally running walls which structure is placed on a tubular reaction vessel. The starting material enters the outer channel thus formed and moves on toward the middle in a nearly horizontal direction until an overflow takes place into the tubular part of the apparatus. In the tubular reaction chamber, an inert gas is introduced at a distance of at least two meters below the melt level that establishes itself. The carrying off of the gas-steam mixture takes place in an upward direction. In this manner, the dehydration takes place only in the tubular part of the apparatus inasmuch as the gas-steam mixture does not flow through the reaction composition in the upper tanklike portion of the apparatus.

Although the known apparatus provides considerable advantages, especially with respect to the throughput speed and/or the obtainable degree of polymerization of the polyamide, such apparatus requires a complete rebuilding of the apparatus units on hand. The units on hand are several meters higher and smaller in diameter than the known apparatus. A change in the construction of existing reaction tubes which are mainly arranged in groups in a narrow space in accordance with the modification described above requires considerable expense. Furthermore, enlarging the equipment under the given space conditions in many cases is impracticable.

The principal objective of the present invention is to provide an apparatus which can be formed without making complicated and expensive modifications of existing tubular reaction vessels and yet can achieve highly satisfactory results.

Other objects of the invention will become apparent to those skilled in the art from the following detailed description. The invention can best be seen by reference to the attached drawing in which a sectional view of the apparatus is set forth.

In the drawing, reaction tube 1 is shown as heated by means of heating fluids in three stages 2, 3 and 4. A lactam melt such as caprolactam is passed into the top of the reaction tube and the produced polyamide is withdrawn from the bottom of the tube. Within the tube there is a truncated-conical bell 5. The distance 6 between the lower edge of the bell and the vessel wall preferably is about 15 cm. At a slight distance below the edge of the bell there is inserted a ring 7 having a wedge-shaped profile, which ring lies against the wall of the reaction vessel. The smallest inside diameter of the profile ring is less than or at most equal to the diameter of the lower bell edge 14. Feed lines 8 for inert gas run axially parallel through the bell and preferably terminate about 2 m. below the bell edge 14. These feed lines are preferably capillary tubes having relatively narrow diameters of about 3 mm. which are bent upward. The number of capillaries is determined according to the diameter of the reaction tube. The discharge tube 10 for the gas-steam mixture is connected to the bell top 9 and runs axially parallel in the upper portion of the reaction tube. In cooler 11 the water is condensed and can thereafter be removed over water separator 12. The feed of inert gas and the discharge of the gas-steam mixture are regulated in such a manner that the melt surface 13 within the bell is established only a few centimeters above bell edge 14. In the upper space the gas-steam mixture is collected. The level of the melt surface in the bell is controlled by counterpressure of the adjustable immersion unit 15. U-tube 16 is used as the level indicator of the melt in the bell in which the pressure difference is measured of the gas stream introduced at the lower bell edge through tube 17 against the gas stream drawn off through the bell. Above the bell and below the gas input the reaction tube is equipped with baffle plates 18 which assure uniform flow of the reaction composition. It is evident, of course, that the bell may have a different form than that shown in the drawing.

It was found that in the polycondensation of polyamide-forming compounds, and in particular caprolactam, the polycondensation can be carried out very favorably in the subject tubular reaction vessel. The reaction vessel is heated to a different temperature in several stages and has in its lower portion feeds for inert gases and in its upper portion discharge units for the gas-steam mixture. In the vessel the truncated-conical bell is arranged at a distance of at least 1.5 meters, and preferably at least 2 meters, below the melt level that establishes itself. Discharge lines for the gas-steam mixture proceed from the top of the bell while the feed lines for the inert gases run axially or axially parallel through the bell and/or the reaction tube at a distance of at least 1.5 meters, and preferably 2 meters, below the edge of the bell. The wedge-shaped ring which is inserted in the reaction tube at a slight distance below the edge of the bell prevents the rise of nitrogen bubbles alongside the bell into the upper portion of the reaction tube.

In carrying out the polycondensation reaction of caprolactam in the subject apparatus, it is possible to improve the throughput by 33%. It is likewise possible to obtain an improvement of the polymerizate which is expressed as an increase of the solution viscosity from 2.33 to 2.60 over that obtainable using the conventional tubular reactor. The solution viscosity is measured as a 1% solution in 90% formic acid at 25° C.

Obviously many modifications and variations of the invention as hereinbefore set forth may be made without departing from the spirit and scope thereof, and therefore only such limitations should be imposed as are indicated in the appended claims.

I claim:

1. Apparatus for the polycondensation of polyamide-forming compounds which comprises: a vertically disposed and cylindrical reaction vessel; means for passing molten polyamide-forming compounds into the upper portion of said reaction vessel and means for withdrawing molten polyamide from the bottom of said vessel; temperature control means for maintaining sections of said reaction vessel at preselected temperatures; a bell-shaped member closed at its upper, smaller end and open at its larger, bottom end positioned within said vessel at a substantial distance below the melt level within said vessel, the diameter of said bell-shaped member at its larger, bottom end being less than the diameter of said reaction vessel whereby fluid can pass around said bell; a ring inserted in the reaction vessel and in contact with the inner surface of said reaction vessel, said ring being positioned below the bottom opening of said bell, the diameter of said ring being no greater than the diameter of the bell at the lowest point of said bell; feed lines for carrying inert gases axially positioned in said vessel and passing through said bell the discharge ends of said lines being located at a substantial distance below the bottom edge of said bell and below said ring; a discharge line for carrying a gas-steam mixture from the interior of said bell and out of said reaction vessel; and means for regulating the gas pressure within said bell so as to control the height to which said melt rises within said bell.

2. Apparatus for the polycondensation of polyamide-forming compounds which comprises: a vertically disposed and cylindrical reaction vessel; means for passing molten polyamide-forming compounds into the upper portion of said reaction vessel and means for withdrawing molten polyamide from the bottom of said vessel; temperature control means for maintaining sections of said reaction vessel at three different preselected temperatures; a bell-shaped member closed at its upper, smaller end and open at its larger, bottom end positioned within said vessel at a substantial distance below the melt level within said vessel and within said second temperature section, the diameter of said bell-shaped member at its larger, bottom end being less than the diameter of said reaction vessel whereby fluid can pass around said bell; a ring inserted in the reaction vessel and in contact with the inner surface of said reaction vessel, said ring being positioned below the bottom opening of said bell, the diameter of said ring being no greater than the diameter of the bell at the lowest point of said bell; feed lines for carrying inert gases axially positioned in said vessel and passing through said bell the discharge ends of said lines being located at a substantial distance below the bottom edge of said bell and below said ring and in the lowest temperature section of said vessel; a discharge line for carrying a gas-steam mixture from the interior of said bell and out of said reaction vessel; and means for regulating the gas pressure within said bell so as to control the height to which said melt rises within said bell.

3. Apparatus as in claim 2, wherein said ring has a wedge-shaped profile.

References Cited by the Examiner
UNITED STATES PATENTS

| 2,463,757 | 3/1949 | Ely et al. | 23—283 X |
| 2,562,796 | 7/1951 | Koch. | |
| 2,810,630 | 10/1957 | Herele | 23—285 |
| 2,889,211 | 6/1959 | Rodenacker et al. | 23—283 |

FOREIGN PATENTS

| 319,214 | 3/1957 | Switzerland. |

MORRIS O. WOLK, *Primary Examiner.*